Jan. 23, 1923.　　　　　　　　　　　　　　　　　1,443,031
C. MIDDELTHON.
MACHINE FOR APPLYING SEALING MATERIAL TO CAN LIDS.
FILED OCT. 4, 1920.　　　　　　　　　　2 SHEETS-SHEET 2
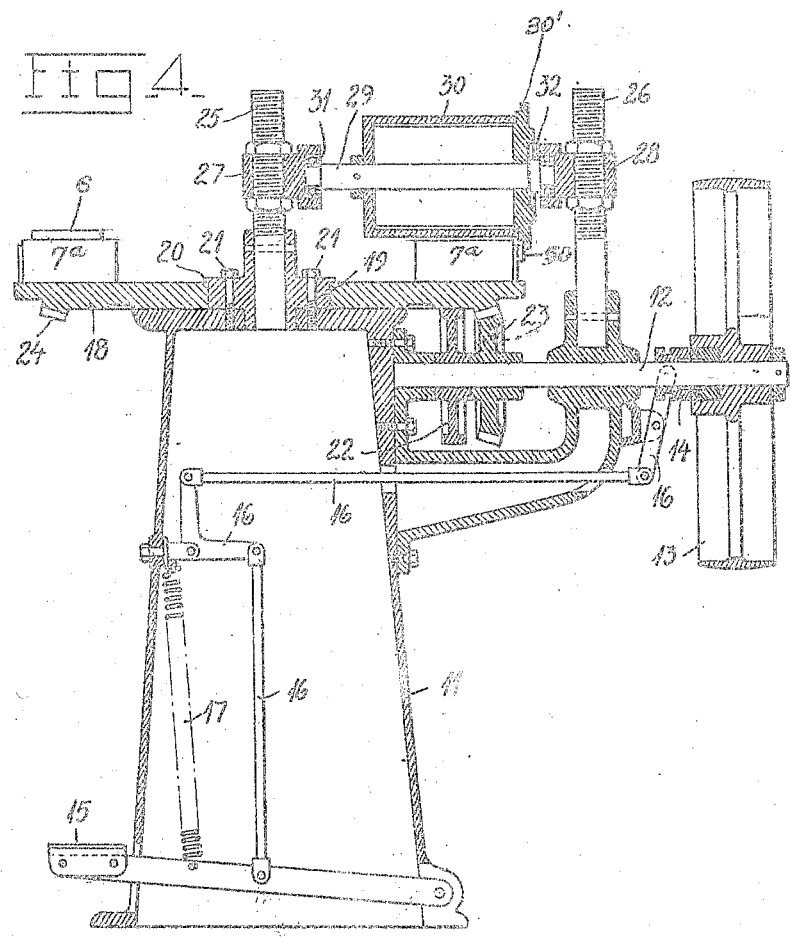
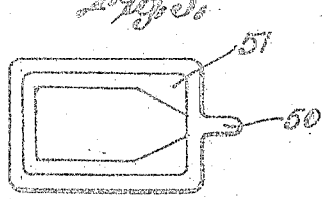
Inventor
C. Middelthon
By H. R. Kulaki
Attorney Patented Jan. 23, 1923.

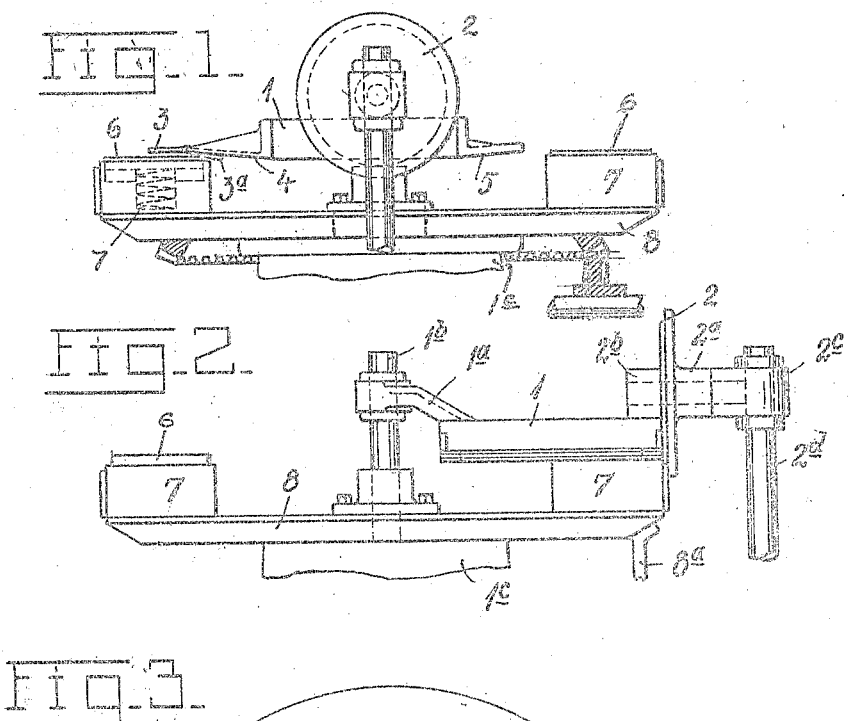

1,443,031

UNITED STATES PATENT OFFICE.

CORNELIUS MIDDLETHON, OF STAVANGER, NORWAY.

MACHINE FOR APPLYING SEALING MATERIAL TO CAN LIDS.

Application filed October 4, 1920. Serial No. 414,716.

*To all whom it may concern:*

Be it known that I, CORNELIUS MIDDLETHON, citizen of Norway, residing at Skansegaten 13, Stavanger, Norway, have invented certain new and useful Improvements in Machines for Applying Sealing Material to Can Lids (for which I have filed applications in Norway, #19933 and #17984, April 20, 1920, and October 3, 1919, respectively), of which the following is a specification.

A machine has been used prior to the present invention for applying sealing material to the lids of tins by means of a reciprocating heating plunger or the like, which plunger conforms to the contour of the lid and exerts a pressure abruptly over the entire surface of the lid.

The method carried out by this known machine, requires a great force, and at the same time the jerky action of the method is injurious to the machine as well as to the quality of the product.

The primary object of the present invention is to overcome the disadvantages of this known type of machine by furnishing a machine which exerts the pressure gradually over successive portions of the lid. This may be accomplished by mounting the supporting block on a rotating table, which block passes during the rotation of the table, below a heating head, which may be vertically adjustable and so constructed that the pressure upon the lid and sealing material is exerted gradually. The means for exerting the pressure and applying heat may consist of a fixed head provided with inclined edges and adapted to subject the lids and sealing rings to a gradually increasing pressure and heating when they pass below the same. Said pressing and heating means may also consist of a drum which will rotate freely when in contact with the lids. The press may also be provided with means for bending the tearing tongue of the lid.

Referring to the drawings:

Figures 1 and 2 are side views, at right angles to each other of the table carrying the supporting blocks, the heating head in this construction being fixed.

Figure 3 is a plan view thereof with the supporting blocks removed.

Figure 4 is a vertical sectional view of a press in which the pressure is exerted by a rotatable device.

Figure 5 is a top plan view of one type of lid which may be operated upon by the improved machine.

Referring to Figures 1, 2 and 3, 1 is the heating head, below which the supporting blocks for the lids and sealing material may pass, for the purpose of heating the sealing rings, and pressing the same against the lids. The heating head is carried by an arm $1^a$ adjustably attached to a fixed shaft $1^b$, projecting from the frame $1^c$ of the press.

The rotatable disc 2 serves the purpose of pressing down the tongue 50 of the lid 51, shown in Fig. 5. The disc is mounted upon a shaft $2^a$ resting at one end in a bearing $2^b$, which is fixed at one end to the heating-head and at the other end to a bearing $2^c$, which is adjustably carried upon a vertical bar $2^d$.

A turnable wing 3 is pivotally mounted on an inclined plate 4 on the front or entrance end of the head 1 and has an extension $3^a$ on the opposite side of the pivot of the wing, the said extension being disposed at a suitable angle to the front part of the plate. On the opposite or discharge end of the heating head is placed a similar plate 5, having no turnable wing.

The support blocks 7 are arranged at spaced points on the upper surface of the table 8 and are constructed in the usual manner, each having a vertically reciprocating plate 6 acted upon by a spring, as shown at the left in Figure 1. Upon this plate 6 are placed the lids carrying the sealing rings.

The table 8, which carries the supporting blocks 7 is rotatably mounted on the frame $1^c$. Beneath the table and arranged directly under the heater-head is a support $8^a$, which engages the table and prevents the table from being forced down on one side by the pressure exerted by the heater-head, when one of the support blocks with a lid thereon is moved beneath the head 1.

The heating head 1 is adjusted to a proper distance above the table 8, according to the size of the supporting blocks 7, and is heated to a desired degree by any suitable means, for instance by electricity. When starting the machine, the blocks 7 placed upon the table will pass below the wing 3, and will be subjected to a gradually increasing pressure, as the blocks move beneath the main portion of the head 1, the lids being thereby held in a fixed manner upon the blocks and the sealing rings being heated by the head 1. When a block with the lid which it carries passes the disc 2, the tongue 50 of the lid is engaged by said disc and gradually pressed downwards until it occupies a position substantially at right angles to the lid. The block 7 when leaving the heating head passes below the plate 5 and due to the inclined surface of the same, the pressure against the plate 6 will be gradually decreased, and the spring beneath the said plate will force the same upwardly.

It will be understood that the greater the length of the heated surface passed by the block 7 and the lid, the weaker may be the electric current necessary for heating the head 1.

Referring to Fig. 4, 11 is the machine-frame. The main shaft 12 is mounted in bearings, suitably arranged in arms fixed to the frame, the shaft being rotated from a pulley 13 through an intermediate coupling 14, which may be released by means of a pedal 15 acting upon the coupling through a lever and bar device 16, the coupling being normally in active position by means of a spring 17. The turnable table 18 is rotatably mounted on a sleeve 19, which is provided with a flange shoulder 20, holding the table 18 against the frame, the sleeve being connected to the frame by means of screws 21. The main shaft 12 further carries a supporting roll 22 bearing against a roller path on the table and having the same function as the part 8ª of Fig. 2. The table is rotated by means of a beveled gear 23 intermeshing with a toothed rim 24 on the lower side of the table. The bolts 25 and 26, fixed to the frame, carry supports 27 and 28 for the shaft 29, upon which is mounted the heated pressing drum or heating head 30. The supports 27 and 28 may be vertically adjusted by means of nuts below and above the same. In order that the shaft may be adjusted to vary its inclination relatively to the table 18, it may rest in suitable ball-bearings 31 and 32, so that one of the bearings may be raised above the other without causing the shaft to bind.

The lids to be provided with sealing-rings are placed on supporting blocks 7ª upon the table and are successively carried below the heating-drum as the table is rotated by means of the shaft 12. As the lid passes beneath the annular flange 30' on the drum 30, the tongue 50 of the lid will be gradually bent downwardly by said flange. By adjusting the supports 27 and 28 relatively to each other as well as to the table, a suitable positioning of the drum may be secured. By this construction a suitable pressure is secured as well as uniform pressure upon the sealing material, as the drum rotates when the lids engage the same. Due to the gradual pressing of the rings only a small force is necessary to drive the apparatus, a jerky operation of the machine is prevented, and the machine will only be subjected to slight wear.

Due to the continuous movement of the table, the machine will be more simple in construction than such machine heretofore known, in which several releasing and stopping means are used in order that the table may be stopped in a position suitable for moving the heating-head against the lid, in order to fix the sealing material to the lid. For this reason the machines were very complicated, and the reliability of the machines not as good as that obtained by the improved machine herebefore described.

Having now particularly described my invention what I claim is:—

1. A machine for fixing sealing material to the lids of tins and the like, including a heating head member, a table member associated therewith, a support block carried by one of said members and adapted to support a lid and its sealing material, means for rotating one of said members relatively to the other member to cause said block to pass between said members, and means associated with one of said members for bending down a tongue on a lid supported by said supporting block.

2. A machine for fixing sealing material to lids of tins and the like, including a heating head member, a table member associated therewith, a support block carried by one of said members and adapted to support a lid and its sealing material, means for rotating one of said members relatively to the other member to cause said block to pass between said members, and an annular disk-shaped member associated with said heating head member for bending down the tongue of a lid carried by the supporting block when said supporting block is passed between said members.

3. A machine for fixing sealing material to the lids of tins and the like including a heating head member formed of a rotatable drum, a table member associated therewith, a support block carried by one of said members and adapted to support a lid and its sealing material, means for rotating one of said members relatively to the other member to cause said block to pass between said member, and an annular flange carried by the drum and adapted to press down the tongue of a lid carried by the supporting block when said supporting block passes between the members.

4. A machine for fixing sealing material to the lids of tins and the like, including a heating head member formed of a plate having diverging side edges, a pivoted flap arranged at one edge of said plate, a table member associated with said head member, a support block carried by the table member and adapted to support a lid and its sealing material, and means for rotating said table member relatively to the head member to cause said block to pass between said members.

In testimony whereof I affix my signature.

CORNELIUS MIDDELTHON.

Witnesses:
A. B. COOK,
EDITH SKANGEN.